United States Patent
Joshi et al.

(10) Patent No.: US 11,328,043 B2
(45) Date of Patent: May 10, 2022

(54) SPOOF DETECTION BY COMPARING IMAGES CAPTURED USING VISIBLE-RANGE AND INFRARED (IR) ILLUMINATIONS

(71) Applicant: Advanced New Technologies Co., Ltd., George Town, KY (US)

(72) Inventors: Yash Joshi, Kansas City, MO (US); Vikas Gottemukkula, Kansas City, KS (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 538 days.

(21) Appl. No.: 16/355,374

(22) Filed: Mar. 15, 2019

(65) Prior Publication Data

US 2020/0293640 A1    Sep. 17, 2020

(51) Int. Cl.
*G06F 21/32* (2013.01)
*G06K 9/00* (2006.01)

(52) U.S. Cl.
CPC .......... *G06F 21/32* (2013.01); *G06K 9/0061* (2013.01); *G06K 9/00604* (2013.01); *G06K 9/00617* (2013.01)

(58) Field of Classification Search
CPC ............... G06F 21/32; G06K 9/00604; G06K 9/00617; G06K 9/0061; G06K 9/2018; G06K 2009/00932; G06K 9/4628; G06K 9/6274; G06K 9/00906
See application file for complete search history.

(56) References Cited

U.S. PATENT DOCUMENTS

| | | | |
|---|---|---|---|
| 8,284,019 | B2 | 10/2012 | Pishva |
| 9,390,327 | B2 | 7/2016 | Gottemukkula et al. |
| 2002/0136435 | A1 | 9/2002 | Prokoski |
| 2004/0041997 | A1 | 3/2004 | Uomori et al. |
| 2004/0186363 | A1 | 9/2004 | Smit et al. |
| 2005/0265585 | A1 | 12/2005 | Rowe |
| 2007/0004972 | A1 | 1/2007 | Cole et al. |

(Continued)

OTHER PUBLICATIONS

Uzair et al., "Is spectral reflectance of the face a reliable biometric?" Optics Express, Jun. 2015, 23(12):15160-15173.

(Continued)

*Primary Examiner* — Abhishek Sarma
(74) *Attorney, Agent, or Firm* — Fish & Richardson P.C.

(57) ABSTRACT

Technology described herein can be embodied in a method for preventing access to a secure system based on determining a captured image to be of an alternative representation of a live person. The method includes capturing a first image and a second image of a subject illuminated by electromagnetic radiation in a first and a second wavelength ranges, respectively. The method also includes extracting, from the first image, a first portion representative of a sclera region of the subject, and from the second image, a second portion representative of the same region. It is determined that each of the first portion and the second portion includes features representative of vasculature in the sclera region, and in response, the subject in the image is identified to be an alternative representation of a live person. Upon search identification, the method includes preventing access to the secure system.

20 Claims, 5 Drawing Sheets (56) References Cited

U.S. PATENT DOCUMENTS

| | | | |
|---|---|---|---|
| 2008/0025579 A1 | 1/2008 | Sidlauskas et al. | |
| 2015/0286864 A1* | 10/2015 | Gottemukkula | G06K 9/6212 |
| | | | 382/117 |
| 2016/0267339 A1 | 9/2016 | Nakano et al. | |
| 2016/0335483 A1 | 11/2016 | Pfursich et al. | |
| 2016/0371555 A1 | 12/2016 | Derakhshani et al. | |
| 2017/0091550 A1* | 3/2017 | Feng | G06T 7/38 |
| 2017/0124374 A1 | 5/2017 | Rowe et al. | |
| 2017/0257770 A1* | 9/2017 | Derakhshani | G06K 9/00288 |
| 2017/0286788 A1 | 10/2017 | Fan et al. | |
| 2017/0323167 A1 | 11/2017 | Mapen et al. | |
| 2017/0325721 A1 | 11/2017 | Matsuda et al. | |
| 2017/0344793 A1 | 11/2017 | Xue et al. | |
| 2018/0053044 A1 | 2/2018 | Su et al. | |
| 2018/0165512 A1 | 6/2018 | Fan | |
| 2018/0181794 A1 | 6/2018 | Benini et al. | |
| 2018/0247142 A1 | 8/2018 | Oda et al. | |
| 2018/0285668 A1* | 10/2018 | Li | G06K 9/6269 |
| 2018/0349721 A1* | 12/2018 | Agrawal | G06K 9/00617 |
| 2019/0025672 A1 | 1/2019 | Van Der Sijde et al. | |
| 2019/0068367 A1 | 2/2019 | Baughman et al. | |
| 2019/0147213 A1 | 5/2019 | Yeke Yazdandoost et al. | |
| 2019/0207932 A1 | 7/2019 | Bud et al. | |
| 2019/0278974 A1 | 9/2019 | Lubin et al. | |
| 2019/0362120 A1 | 11/2019 | Yeke Yazdandoost et al. | |
| 2020/0104567 A1 | 4/2020 | Tajbakhsh et al. | |
| 2020/0134242 A1 | 4/2020 | Parupati et al. | |
| 2020/0134344 A1 | 4/2020 | Joshi et al. | |
| 2020/0134345 A1 | 4/2020 | Joshi et al. | |
| 2020/0210738 A1 | 7/2020 | Parupati et al. | |
| 2020/0250448 A1 | 8/2020 | Joshi et al. | |

OTHER PUBLICATIONS

PCT International Search Report and Written Opinion in International Application No. PCT/US2019/058125, dated Feb. 5, 2020, 11 pages.

PCT International Preliminary Report on Patentability in International Application No. PCT/US2019/058125, dated Apr. 27, 2021, 8 pages.

Zeng et al. "Spectroscopic and microscopic characteristics of human skin autofluorescence emission," Photochemistry and Photobiology, Jan. 11, 1995, 7 pages.

Sun et al., "TIR/VIS correlation for liveness detection in face recognition," 14th International Conference on Computer Analysis of Images and Patterns, Aug. 2011, 6855:114-121.

Zanuttigh et al., "Operating Principles of Structured Light Depth Cameras," Time-of-Flight and Structured Light Depth Cameras, Springer International Publishing, 2016, Chapter 2, DOI: 10.1007/978-3-319-30973-6_2, pp. 43-79.

U.S. Appl. No. 16/171,029, filed Oct. 25, 2018, Joshi et al.

* cited by examiner

SPOOF DETECTION BY COMPARING IMAGES CAPTURED USING VISIBLE-RANGE AND INFRARED (IR) ILLUMINATIONS

TECHNICAL FIELD

This disclosure relates to image capture devices.

BACKGROUND

Systems incorporating a biometric identification technology such as face recognition or iris recognition often include a camera that captures an image of a user. The captured image is then processed to authenticate the user using the biometric identification technology.

SUMMARY

In one aspect, this document features a method for preventing access to a secure system based on determining a captured image to be of an alternative representation of a live person. The method includes capturing, by one or more image acquisition devices, a first image of a subject illuminated by electromagnetic radiation in a first wavelength range, and capturing, by the one or more image acquisition devices, a second image of the subject illuminated by electromagnetic radiation in a second wavelength range different from the first wavelength range. The method also includes extracting, by one or more processing devices, from the first image, a first portion representative of a sclera region of the subject, and from the second image, a second portion representative of the sclera region of the subject. The method further includes determining, by the one or more processing devices, that each of the first portion and the second portion includes features representative of vasculature in the sclera region, and in response, identifying the subject in the image to be an alternative representation of a live person. Upon search identification, the method includes preventing access to the secure system.

In another aspect, this document features an image acquisition device, and an image analysis engine. The image acquisition device is configured to capture a first image and a second image of a subject, wherein the first and second images are captured under electromagnetic radiation of a first wavelength range and a second wavelength range, respectively. The image analysis engine includes one or more processing devices, and is configured to extract, from the first image, a first portion representative of a sclera region of the subject, and extract, from the second image, a second portion representative of a sclera region of the subject. The image analysis engine is also configured to determine that each of the first portion and the second portion includes features representative of vasculature in the sclera region, and in response, identify the subject in the image to be an alternative representation of a live person. Responsive to identifying the subject in the image to be an alternative representation of a live person, access to a secure system is prevented.

In another aspect, this document features one or more machine-readable storage devices comprising machine-readable instructions configured to cause one or more processing devices to execute various operations. The operations include capturing, by one or more image acquisition devices, a first image of a subject illuminated by electromagnetic radiation in a first wavelength range, and capturing, by the one or more image acquisition devices, a second image of the subject illuminated by electromagnetic radiation in a second wavelength range different from the first wavelength range. The operations also include extracting, from the first image, a first portion representative of a sclera region of the subject, and from the second image, a second portion representative of the sclera region of the subject. The operations further include determining that each of the first portion and the second portion includes features representative of vasculature in the sclera region, and in response, identifying the subject in the image to be an alternative representation of a live person. Upon search identification, the operations include preventing access to the secure system.

Implementations of the above aspects can include one or more of the following features.

The first wavelength range can include the range of visible light in the electromagnetic spectrum. The first wavelength range can include wavelengths in a 400-700 nm range. The second wavelength range can include the infrared (IR) portion of the electromagnetic spectrum. The second wavelength range can include wavelengths in a 700-1400 nm range. Determining that each of the first portion and the second portion includes features representative of vasculature in the sclera region can include generating, for each of the first and second portions, a frequency domain representation, and determining, from each of the frequency domain representations, that an amount of high frequency features in the corresponding portion satisfies a threshold condition. Determining that each of the first portion and the second portion includes features representative of vasculature in the sclera region can include performing, on each of the first and second portions, an edge detection process, and determining, based on outputs generated by the edge detection process, that each of the first and second portions includes a plurality of edges representative of the vasculature. A determination may be made that the first portion includes features representative of vasculature in the sclera region, and the second portion does not include features representative of vasculature in the sclera region, and in response, the subject in the image can be identified as a live person. As eyelashes are seen in both visible and IR, in some implementations, the eyelashes are matched after image registration between the visible and IR image (e.g., using eye corners). The presence of eyelashes and absence of vasculature can therefore be used in identifying a subject as a live person, and consequently in avoiding attacks at the sensor level. Responsive to identifying the subject in the image to be a live person, an authentication process can be initiated to determine if the live person is authorized to access the secure system. The alternative representation of a live person can include a photograph of the live person printed on paper. The secure system can include a user-interface disposed in a kiosk.

Various implementations described herein may provide one or more of the following advantages. Reliability and/or security of a biometric authentication system can be improved by allowing the system to discriminate between live persons and alternative representations such as photographs displayed on paper or display devices. By allowing a biometric authentication system to discriminate between an image of a live person and an image of a spoof alternative representation, additional processing can be preemptively terminated, thereby creating an additional layer of security. In some cases, the technology described herein allows for implementing a spoof detection system while reducing requirements for additional hardware. This in turn in some cases, can reduce costs associated with the underlying biometric authentication system.

Repeat use of reference characters in the present specification and drawings is intended to represent same or analogous features or elements.

DETAILED DESCRIPTION

This document presents an image analysis method in which an image captured using an image acquisition device of a biometric authentication system is analyzed to determine if the image corresponds to an actual live person, or to an alternative representation (e.g., a photograph or another image of the live person printed on paper, or displayed on a high definition display device) of the live person. Specifically, the technology described herein includes capturing images of a feature of interest (e.g., the eye(s) of a user) under both illumination in the visible range and in the infrared (IR) range. Analogous portions of a visible-range image and a corresponding IR image are then compared to detect whether certain features (e.g., eye vasculature) are present in both. Because IR illumination is absorbed by vasculature, an IR image of a human eye is not expected to show vasculature. On the other hand, the vasculature is expected to be visible in a visible-range image. These differences between visible-range and IR images can be used to determine that the captured images correspond to an actual live person. However, if the veins are visible in both the visible-range image as well as the IR image, the images can be determined to be that of an alternative representation.

If the captured image is not determined to correspond to a live person, any further processing of the captured image by the biometric authentication system can be stopped, and any corresponding access attempt can be prevented immediately. Many biometric authentication systems involve authenticating a user to a secure system based on recognizing the user's face, eye-print, iris etc. Such biometric authentication systems involve capturing one or more images of a user, and executing corresponding recognition processes on the captured image. Malicious attempts to breach the security of such biometric authentication systems can include presenting an alternative representation of a live person to gain access to an account or other privileges associated with the identity of the corresponding live person. Such attacks are generally known as spoof attacks, and the reliability/security of a biometric authentication system can be determined by the ability of the system to differentiate between a live person and corresponding alternative representations (also referred to as spoofs). The technology described herein improves security/reliability of biometric authentication systems that rely on recognizing a user based on face recognition, eye-print recognition, iris recognition etc. Specifically, this document describes preprocessing steps that allow for determining whether the captured image corresponds to an actual live person or a spoof alternative representation such as a printed or displayed image/photograph of the live person. Upon detecting that the captured image is a spoof, any further processing of the image to allow access to the corresponding secure system can be prevented, thereby adding an added layer of security to the system.

Figure 1:
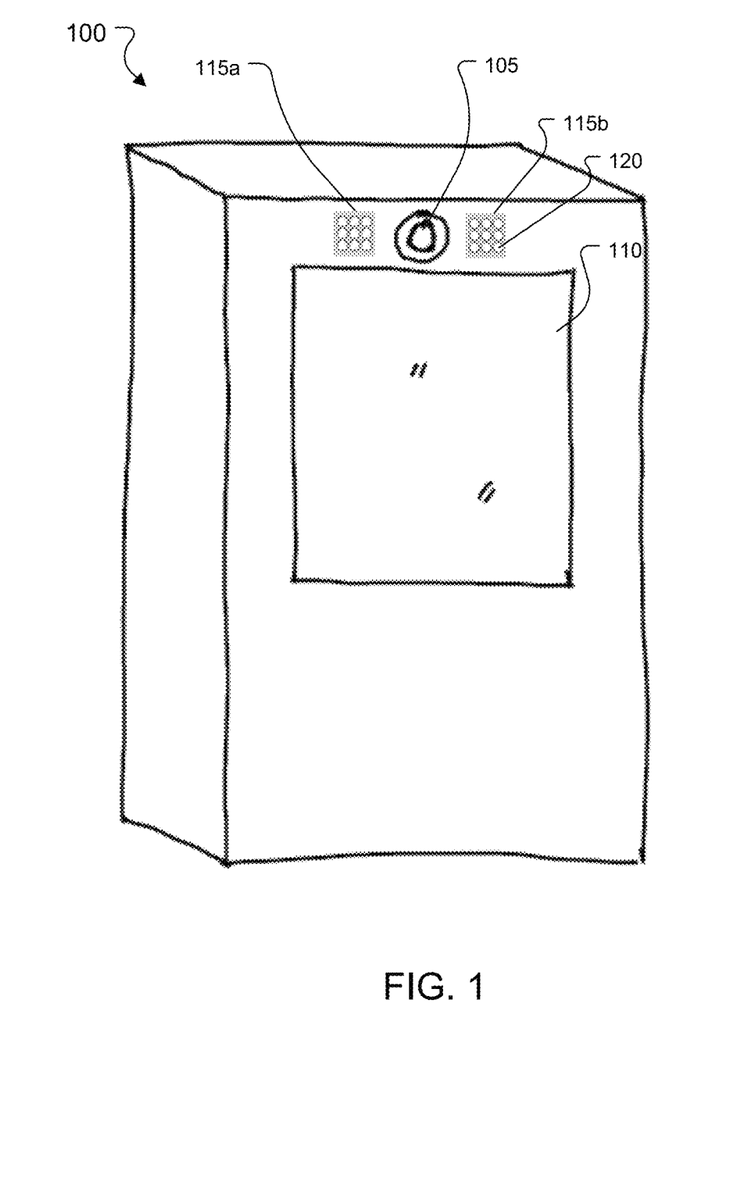
FIG. 1 shows a kiosk machine as an example environment in which the technology described herein may be used.

FIG. 1 shows a kiosk machine 100 as an example environment in which the technology described herein may be used. Such kiosk machines may be used for various purposes that require authenticating users via one or more biometric authentication processes. For example, the kiosk 100 can include an automated teller machine (ATM) that allows a user to withdraw money from a bank account. In another example, the kiosk 100 may be deployed at a restaurant or a fast-food outlet, and allow a user to order and pay for food. The kiosk 100 may also be deployed at an entry point (e.g., at the gate of an arena or stadium) to authenticate entrants prior to entering the venue. In general, the kiosk 100 may be deployed at various types of locations to authenticate users interactively, or even without any active participation of the user.

In some implementations, the kiosk 100 can include one or more illumination sources 115a, 115b (115, in general) in accordance with the underlying biometric authentication system. For example, to support the technology described herein, the kiosk 100 can include an illumination source 115a for generating electromagnetic radiation in the visible range, and a second illumination source 115b for generating electromagnetic radiation in the IR wavelength range. In some implementations, each of the illumination sources 115 can include one or more individual sources 120. In some implementations, some of the individual sources 120 can be configured to radiate IR illumination and some of the individual sources 120 can be configured to radiate visible light. In some implementations, the individual sources 120 can include a light-emitting diode (LED) that can radiate electromagnetic energy in multiple wavelength ranges (e.g., both in the visible range and in the IR range. For example, the wavelength ranges radiated by the individual sources 120 can include the visible spectrum of about 400-700 nm, and the IR/NIR spectrum of about 700-1400 nm. While the example in FIG. 1 shows two illumination sources 115 that are physically separated along a horizontal direction, more or fewer illumination sources 115 may also be used. Also, while the example in FIG. 1 shows a kiosk 100, the technology described herein can be used in other devices. For example, the spoof detection technology described herein can also be implemented in a mobile device such as a mobile phone, or a tablet device.

The kiosk 100 can also include one or more cameras to capture images under illuminations provided by the one or more illumination sources 115. In some implementations, the kiosk 100 can include a single camera 105 that includes sensors capable of capturing images under both visible-range illumination and IR illumination. In some implementations, the kiosk 100 includes separate cameras for capturing images under visible-range illumination and IR illumination. The one or more cameras 105 can be disposed on the kiosk 100 such that the cameras capture the features of interest (e.g., face, eye, etc.) of users interacting with the kiosk. The captured images may be processed to identify/authenticate valid users, and/or permit or deny access to the services/products being offered through the kiosk. For example, the kiosk 100 may include a display device 110 (e.g., a capacitive touch screen) that allows a user to select and order food at a retail outlet. Once the user completes the selection via user-interfaces presented on the display device 110, the user may be asked to look towards the camera 105 for authentication. The images captured using the camera 105 may then be used to authenticate/identify/verify a pre-stored profile for the user, and the payment for the food may then be automatically deducted from an account linked to the profile.

In some implementations, the images captured using the camera 105 can be processed using an underlying biometric authentication system to identify/verify the user. In some implementations, the biometric authentication system may extract from the images, various features—such as features derived from the face, iris, vasculature underlying the sclera of the eye, or the periocular region—to identify/authenticate a particular user based on matching the extracted features to that of one or more template images stored for the user during an enrollment process. The biometric authentication system may use a machine-learning process (e.g., a deep learning process implemented, for example, using a deep neural network architecture) to match the user to one of the many templates stored for various users of the system. In some implementations, the machine learning process may be implemented, at least in part, using one or more processing devices deployed on the kiosk 100. In some implementations, the kiosk 100 may communicate with one or more remote processing devices (e.g., one or more remote servers) that implement the machine learning process.

In some implementations, the images captured using the camera 105 are used to authenticate/identify/verify a user, and provide access to accounts/privileges associated with the identity of the user. For example, one or more images captured by the camera 105 can be analyzed to recognize a user (e.g., using face recognition, eye-print recognition, iris recognition etc.) using a corresponding underlying biometric authentication process. However, malicious attempts to breach the security of such biometric authentication processes often involve presentation of an alternative representation of a live person (e.g., photograph or other image of the live person printed on paper, or displayed on a high definition display device) in an attempt to cause the underlying biometric authentication system to identify the alternative representation as the corresponding live person. Therefore, in many cases, the security and/or reliability of the underlying biometric authentication system depends on the ability of the system to discriminate between actual live persons and spoof alternative representations such as printed photographs or images displayed on display devices. The technology described herein allows for improving the discrimination capabilities of biometric authentication systems, thereby improving reliability/security of the systems.

The technology described herein can be used to differentiate between an image of a live person and that of an alternative representation of a live person by analyzing portions of the captured images. For example, analogous portions of visible-range and IR images of an eye can be analyzed to detect the presence/absence of veins/vasculature in the sclera region of the eye. Such vasculature typically absorbs IR energy, and is therefore not visible in IR images. On the other hand, if the IR illumination is incident on an alternative representation (e.g., a photograph printed on paper), the absence of actual vasculature causes the IR energy to be reflected similarly from all portions of the alternative representation, thereby causing the vasculature to be visible in the corresponding IR image. Such differential behavior of vasculature is not observed in visible-range images, where the vasculature is visible in images of live persons, as well as those of alternative representations. Therefore, if the visible range image of an eye shows vasculature, and the corresponding IR image does not show vasculature, the subject of the images can be determined to be a live person. In contrast, if both the visible-range image and the IR image of the eye show vasculature, the subject of the images can be determined to be an alternative representation such as a photograph printed on paper.

The presence/absence of features such as veins/vasculature in the sclera region of the eye can be detected, for example, using various image processing techniques. In some implementations, an edge detection process can be executed on a captured image, and the edges present in the sclera portion of the image can be used to determine whether or not vasculature is present. In some implementations, Gabor filtering can be used to detect presence of vasculature in the sclera region of the eye. Other possible techniques include the use of an edge detector (e.g., Canny, Sobel, or Haar edge detector) on a RGB/Grey image, possibly with color guidance to identify the vasculature. In some implementations, the captured image (with or without a pre-processing step such as edge detection) can be subjected to a frequency domain transformation, and an amount of energy present in the high-frequency regions corresponding to the sclera can be used to determine whether vasculature is present in the region. Substantially similar processes can be performed on the visible-range image and the IR image, and the results can be compared to determine if the subject of the image is indeed a live person. For example, if the edges detected in the sclera region, or the high frequency components in the sclera region, are substantially similar in both the visible-range image and the IR image, a determination may be made that the subject of the images corresponds to an alternative representation. On the other hand, if edges are detected in the sclera region of the visible-range image, but not in the sclera region of the IR image, the subject of the images can be determined to be a live person.

In some implementations, a learning-based technique can be used for spoof detection. For example, a neural network can be trained to produce a score to detect live/spoof. In some implementations, there are two networks—an edge detector (which can be an auto encoder), and a score generator (which can be a convolutional neural network (CNN)). In some implementations, in a first phase of training, the first network is trained to output the edge information extracted from training images using, for example, one or more edge detection processes described above, possibly in combination with Gabor filtering. The training data set can include greyscale and IR images. In some implementations, the training can be done, for example, by maximizing structural similarity (SSIM) index scores computed between an output of the network and the extracted edges in corresponding training images. Other loss functions that may be included for the training process include, for example, mean square error (MSE), adversarial loss, and perspective loss.

During a second phase of the training process, the second network is trained, and the first network is fine-tuned, possibly at a lower learning rate. In some implementations, two scores (often referred to as a vessel score and a iris-texture score) are used in training the second network, along with weights shared with the first network. For the first part the greyscale and IR outputs from the auto-encoder are separately provided to the second network. Using a segmentation mask for the sclera as an attention map, the encoded greyscale and encoded IR images are multiplied using the attention map, and concatenated to generate the input for the second network. The second network is trained to provide a first score in the range of [0-1], where 0 represents no vasculature and 1 represents the presence of vasculature.

When the attention is shifted to iris region, the second score is expected to be 0 for an auto-encoder output given grey image with dark iris, and a score of 1 is expected for auto-encoder output given an IR image.

Figure 2A:
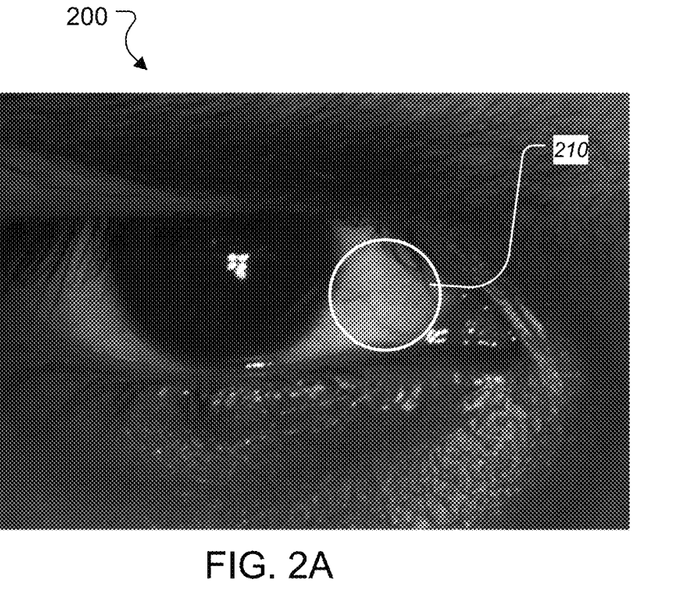
FIG. 2A shows an example of an image of an eye of a live person captured under visible-range illumination.
Figure 2B:
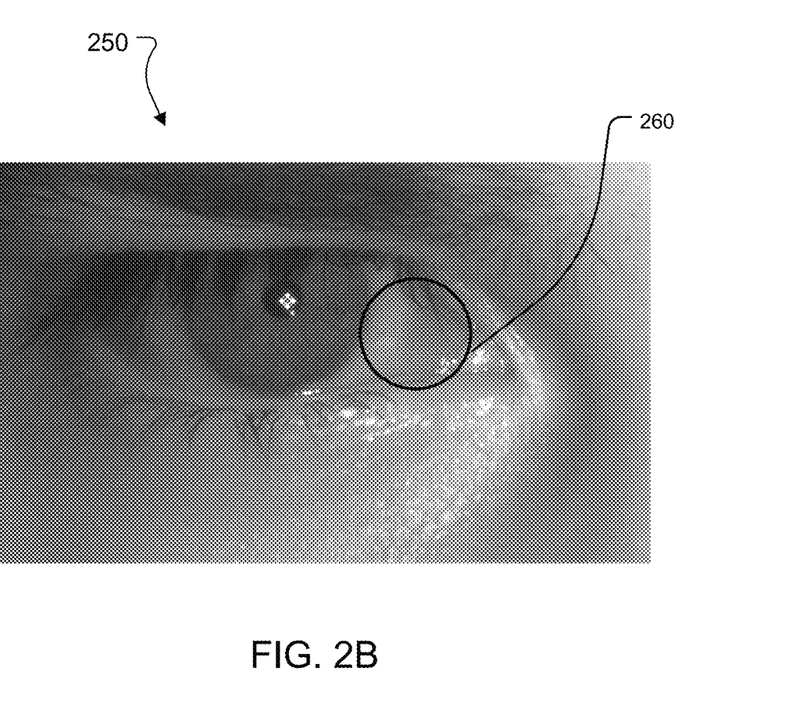
FIG. 2B shows an example of an image of an eye of a live person captured under infrared (IR) illumination.

The differences in images captured for a live person under visible-range and IR illuminations are illustrated by FIGS. 2A and 2B. Specifically, FIG. 2A shows an example of an image 200 of an eye of a live person captured under visible-range illumination, and FIG. 2B shows an example of an image 250 of an eye of a live person captured under IR illumination. In the image 200, the region 210 shows the presence of vasculature in the sclera region of the eye. However, as illustrated by FIG. 2B, the corresponding region 260 in the IR image 250 does not show the vasculature. These differences indicate that the images 200 and 250 correspond to that of a live person, and not a spoof alternative representation. On the other hand, if the vasculature is detected in both the visible-range image and the IR image, a determination can be made that the subject of the images is likely not a live person, but a spoof alternative representation such as a photograph printed on paper.

Figure 3:
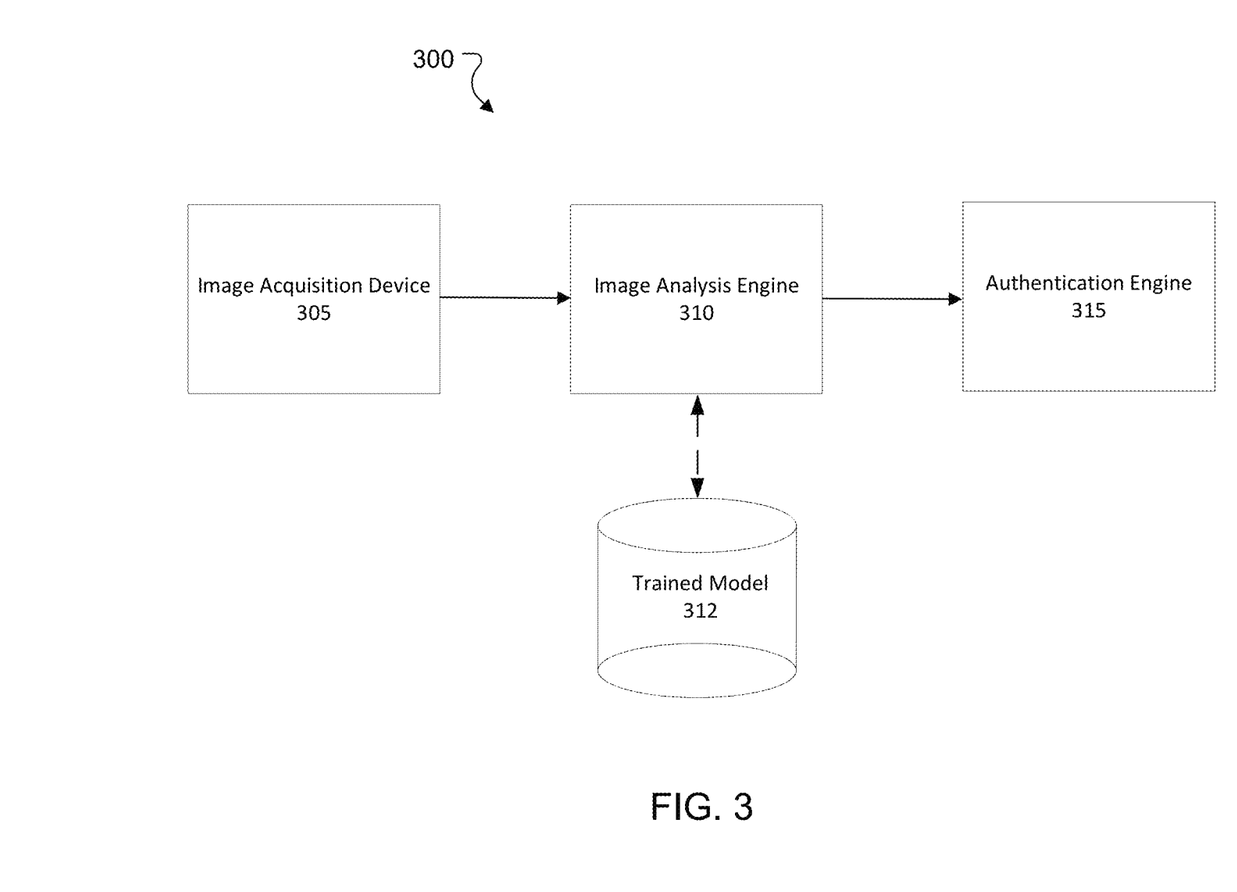
FIG. 3 is a block diagram of an example system usable for implementing the technology described herein.

FIG. 3 shows an example system 300 for analyzing images captured under IR light to determine if the iris images are of live persons or spoof alternatives of live persons. The system 300 can also be used to capture images under IR and non-IR (e.g., visible-range) illumination, and compare sclera portions of the image to determine if the captured images are of a live person or a spoof alternative of a live person. For example, the system 300 can be configured to capture an IR image and an RGB image of a subject, and analyze the sclera portions for the presence/absence of vasculature in the two images to determine whether the subject is a live person or a spoof alternative representation such as a high quality image of a person printed on high quality paper. The system 300 includes an image acquisition device 305 configured to capture images of subjects. In some implementations, the image acquisition device 305 includes one or more cameras substantially similar to the camera(s) 105 described with reference to FIG. 1. The image acquisition device 305 can also include one or more illumination sources. In some implementations, the illumination sources associated with the image acquisition device 305 can be substantially similar to the illumination sources 115 described above with reference to FIG. 1. In some implementations, the image acquisition device 305 includes one or more processing devices configured to generate digital data from the captured images.

The system 300 also includes an image analysis engine 310 that can be configured to analyze images captured by the image acquisition device 305. In some implementations, the image analysis engine 310 is configured to receive digital representations of images captured by the image acquisition device 305 and determine whether or not the images correspond to that of a live person. In some implementations, the image analysis engine 310 includes an analog to digital converter (ADC) to generate digital image data from information (e.g., sensor output) received from the image acquisition device 305. The image analysis engine includes one or more processing devices configured to execute various image analysis processes, including the processes described herein.

In some implementations, the image analysis engine 310 may reside on a computing device (e.g., a server) that is at a remote location with respect to the image acquisition device and/or the authentication engine 315. For example, the image acquisition device 305 can be disposed at a kiosk 100 (or in some implementations, in a mobile device) that communicates over a network with a remote server on which the image analysis engine 310 executes. The image analysis engine 310 can in turn provide an output of the analysis to the authentication engine 315 residing on the kiosk 100. In some implementations, the authentication engine 315 can also reside on a remote server (e.g., the same server one which the image analysis engine 310 resides, or on a different server) and communicate the result of an authentication process to the kiosk 100.

The image analysis engine 310 can be configured to analyze the captured images in various ways, in order to determine whether or not the captured images correspond to a live person. In some implementations, the image analysis engine 310 is configured to extract a portion (e.g., extract image details with a filter) of the image and analyze the extracted portion to detect high-frequency components. For example, the image analysis engine 310 can be configured to compute a frequency domain representation (e.g., a two dimensional Fast Fourier Transform (2D FFT), a discrete cosine transform (DCT), a wavelet transform etc.) of a sclera portion of an image to determine whether the sclera portion of the image includes high frequency components representative of vasculature. In some implementations, the image analysis engine 310 may execute one or more image processing processes such as Gabor filtering or other edge detection techniques to detect the presence of vasculature in sclera using pixel-domain information. In some implementations, the captured images may be pre-processed to extract the sclera portions prior to performing an analysis to detect the presence/absence of vasculature.

In some implementations, the image analysis engine 310 can be configured to execute a machine learning process to discriminate between images of a live person and images of alternative representations of live persons. In such cases, the image analysis engine can access a trained model 312, which has been trained using a learning corpus that includes image-pairs corresponding to live persons, as well as image pairs corresponding to alternative representations. In some implementations, using a machine learning process may improve the performance of the image analysis engine 310 by reducing the false positive rate and/or the false negative rate. In some implementations, the trained model 312 can be trained to account for spoofs presented on various types of papers.

Figure 4:
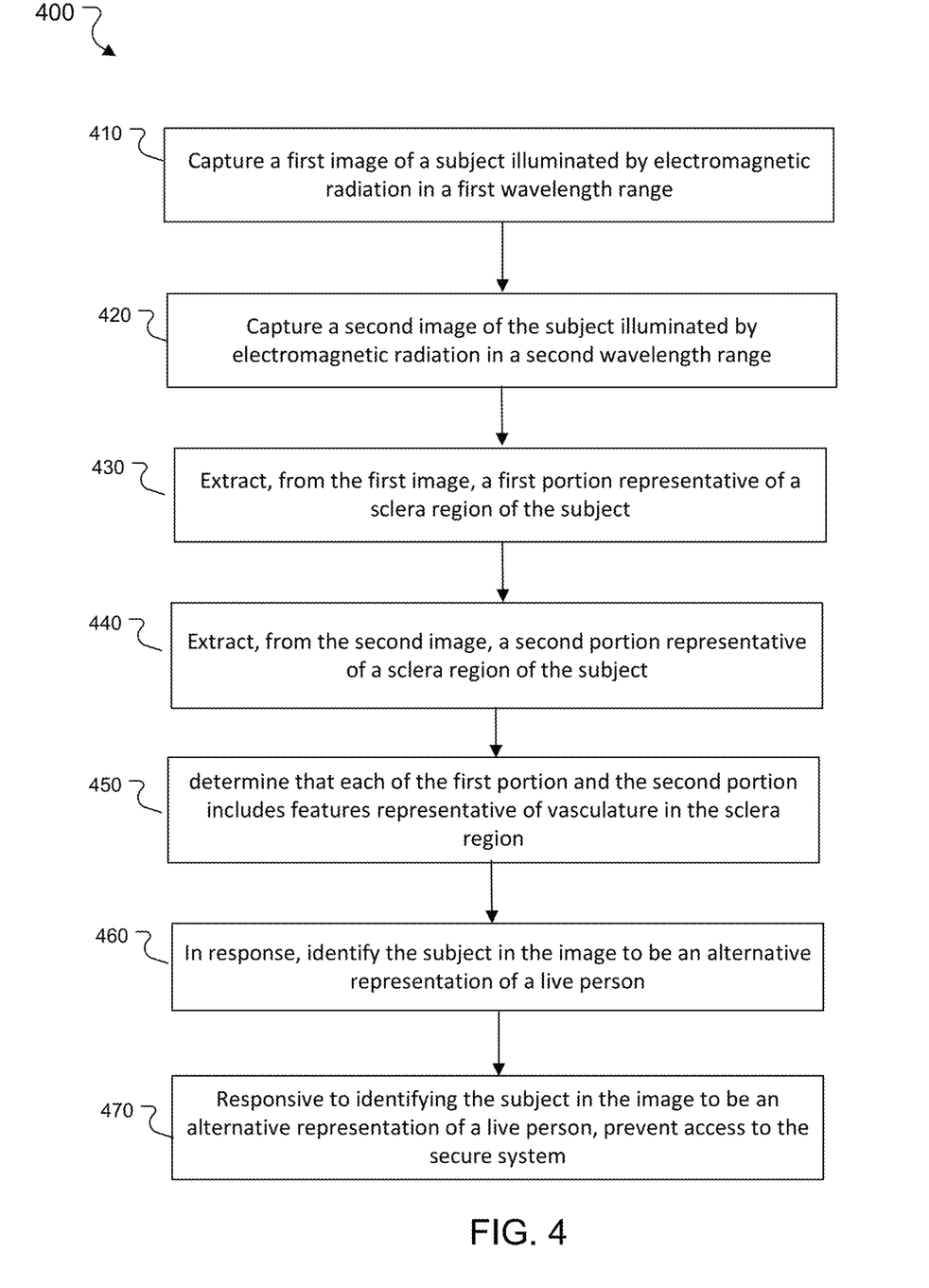
FIG. 4 is a flowchart of an example process for preventing access to a secure system based on determining a captured image to be of an alternative representation of a live person.

FIG. 4 is a flowchart of an example process 400 for preventing access to a secure system based on determining a captured image to be of an alternative representation of a live person. In some implementations, at least a portion of the process 400 may be executed by one or more processing devices disposed within a kiosk such as the kiosk 100 described with reference to FIG. 1. In some implementations, at least a portion of the process 400 may be executed by the image analysis engine 310, which may be disposed within a kiosk, or at one or more servers (such as servers or computing devices in a distributed computing system) in communication with remote components such as one or more processing devices disposed within a kiosk. In some implementations at least a portion of the process 400 can be performed on a mobile device such as a mobile phone or tablet device.

Operations of the process 400 includes capturing, by one or more image acquisition devices, a first image of a subject illuminated by electromagnetic radiation in a first wavelength range (410). The electromagnetic radiation in the first wavelength range can be emitted, for example, by the illumination source 115 as described above with reference to FIG. 1. In some implementations, the illumination source 115 can be disposed in another device such as a smartphone, wherein the spoof detection process described herein is used to prevent unauthorized access to the smartphone. The first wavelength range can include the range of visible light in the electromagnetic spectrum. For example, the first wavelength range can include wavelengths in a 400-700 nm range. Operations of the process 400 also includes capturing, by the one or more image acquisition devices, a second image of the subject illuminated by electromagnetic radiation in a second wavelength range different from the first wavelength range (420). The second wavelength range can include the infrared (IR) portion of the electromagnetic spectrum. For example, the second wavelength range can include wavelengths in a 700-1400 nm range.

Operations of the process 400 further includes extracting from the first image, a first portion representative of a sclera region of the subject (430), and extracting, from the second image, a second portion representative of the sclera region of the subject (440). The first and second portions can be extracted, for example, by identifying the iris portion of the eye, and identifying the non-iris portions as the sclera region. The extracted portions can then be analyzed to determine whether the subject is a live person, or an alternative representation of a live person.

To determine whether the subject in the images is a live person or not, the process 400 can include determining that each of the first portion and the second portion includes features representative of vasculature in the sclera region (450. This can include performing, on each of the first and second portions, an edge detection process, and determining, based on outputs generated by the edge detection process, that each of the first and second portions includes a plurality of edges representative of the vasculature. The edge detection process can include, for example, Gabor filtering or other image processing techniques usable for identifying veins/vasculature in the sclera region of eye images. In some implementations, the vasculature can be detected using a frequency domain process. In some implementations, this can include, generating a frequency domain representation for each of the first and second portions, and determining, from each of the frequency domain representations, that an amount of high frequency features in the corresponding portion satisfies a threshold condition. Determining that the amount of high frequency features in the portion of the image satisfies the threshold condition can include determining that the amount of high frequency features satisfies a value typically associated with sclera portions with vasculature. In some implementations, this can be determined empirically, for example, based on analyzing a large number of eye images. In some implementations, the frequency domain representation can include a two-dimensional Fast Fourier Transform (2D-FFT) of the sclera region of the image. Other frequency domain representations that may be used includes discrete cosine transforms (DCT), wavelet transforms etc.

Responsive to determining that each of the first portion of the first image and the second portion of the second image includes features representative of vasculature in the sclera region, operations of the process 400 includes identifying the subject in the image to be an alternative representation of a live person (460), and in response, preventing access to the secure system (470). In some implementations, where a user-interface of the secure system is disposed as a part of a kiosk, identifying a captured image to be a spoof can prevent an access attempt made through the kiosk. On the other hand, if a determination is made that the first portion includes features representative of vasculature in the sclera region, but the second portion does not include such features that are representative of vasculature in the sclera region, the subject in the image can be identified as a live person, and in response, an authentication process for determining if the live person is authorized to access the secure system can be initiated. In some implementations, this can be done, for example, using an authentication system substantially similar to the authentication engine 315 described above with reference to FIG. 3. If such an authentication engine authenticates the live person to access the secure system (e.g., a user account or privileges associated with the access attempt), the live person is allowed to continue the interaction with the corresponding user interface (e.g., a kiosk or a smartphone).

Figure 5:
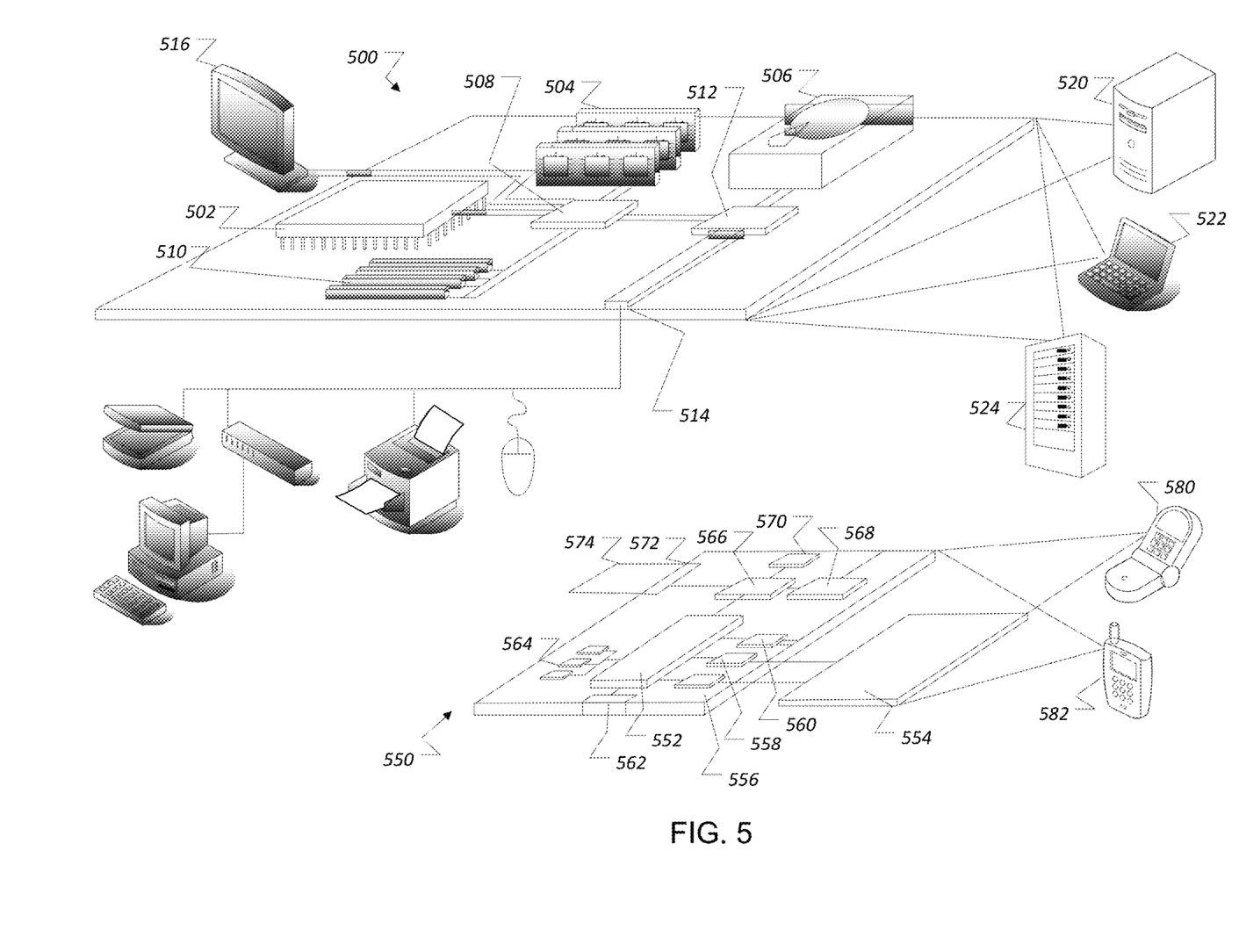
FIG. 5 is a block diagram representing examples of computing devices.

FIG. 5 shows an example of a computing device 500 and a mobile device 550, which may be used with the techniques described here. For example, referring to FIG. 1, the kiosk device 100 can include one or more of the computing device 500 or the mobile device 550, either in part or in its entirety. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, and so forth) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A method for preventing access to a secure system based on determining a captured image to be of an alternative representation of a live person, the method comprising:
    capturing, by one or more image acquisition devices, a first image of a subject illuminated by electromagnetic radiation in a first wavelength range;
    capturing, by the one or more image acquisition devices, a second image of the subject illuminated by electromagnetic radiation in a second wavelength range different from the first wavelength range;
    extracting, by one or more processing devices, from the first image, a first portion representative of a sclera region of the subject;
    extracting, by the one or more processing devices from the second image, a second portion representative of the sclera region of the subject;
    determining, by the one or more processing devices that each of the first portion and the second portion includes features representative of vasculature in the sclera region;
    responsive to determining that each of the first portion of the first image and the second portion of the second image includes features representative of vasculature in the sclera region, identifying the subject in the first image to be an alternative representation of a live person; and
    responsive to identifying the subject in the first image to be an alternative representation of a live person, preventing access to the secure system.

2. The method of claim 1, wherein the first wavelength range includes the range of visible light in the electromagnetic spectrum.

3. The method of claim 2, wherein the first wavelength range comprises wavelengths in a 400-700 nm range.

4. The method of claim 1, wherein the second wavelength range includes the infrared (IR) portion of the electromagnetic spectrum.

5. The method of claim 4, wherein the second wavelength range comprises wavelengths in a 700-1400 nm range.

6. The method of claim 1, wherein determining that each of the first portion and the second portion includes features representative of vasculature in the sclera region comprises:
    generating, for each of the first and second portions, a frequency domain representation; and
    determining, from each of the frequency domain representations, that an amount of high frequency features in the corresponding portion satisfies a threshold condition.

7. The method of claim 1, wherein determining that each of the first portion and the second portion includes features representative of vasculature in the sclera region comprises:
    performing, on each of the first and second portions, an edge detection process; and
    determining, based on outputs generated by the edge detection process, that each of the first and second portions includes a plurality of edges representative of the vasculature.

8. The method of claim 1, further comprising:
    determining that a third portion of a third image of a second subject includes features representative of vasculature in a sclera region of the second subject, and that a fourth portion of a fourth image of the second subject does not include features representative of vasculature in the sclera region of the second subject;
    responsive to determining that the third portion includes features representative of vasculature in the sclera region, and that the fourth portion does not include features representative of vasculature in the sclera region of the second subject, identifying the second subject in the third and fourth images to be a live person; and
    responsive to identifying the second subject in the third and fourth images to be a live person, initiating an authentication process for determining if the live person is authorized to access the secure system.

9. The method of claim 1, wherein the alternative representation of a live person comprises a photograph of the live person printed on paper.

10. The method of claim 1, wherein the secure system comprises a user-interface disposed in a kiosk.

11. A system comprising:
an image acquisition device configured to capture a first image and a second image of a subject, wherein the first and second images are captured under electromagnetic radiation of a first wavelength range and a second wavelength range, respectively; and
an image analysis engine comprising one or more processing devices, the image analysis engine configured to:
extract, from the first image, a first portion representative of a sclera region of the subject,
extract, from the second image, a second portion representative of the sclera region of the subject,
determine that each of the first portion and the second portion includes features representative of vasculature in the sclera region;
responsive to determining that each of the first portion and the second portion includes features representative of vasculature in the sclera region, identify the subject in the first image to be an alternative representation of a live person; and
responsive to identifying the subject in the first image to be an alternative representation of a live person, preventing access to a secure system.

12. The system of claim 11, wherein preventing access to the secure system comprises generating a control signal for an authentication engine that controls access to the secure system.

13. The system of claim 11, wherein the first wavelength range includes the range of visible light in the electromagnetic spectrum.

14. The system of claim 13, wherein the first wavelength range comprises wavelengths in a 400-700 nm range.

15. The system of claim 11, wherein the second wavelength range includes the infrared (IR) portion of the electromagnetic spectrum.

16. The system of claim 15, wherein the second wavelength range comprises wavelengths in a 700-1400 nm range.

17. The system of claim 11, wherein determining that each of the first portion and the second portion includes features representative of vasculature in the sclera region comprises:
generating, for each of the first and second portions, a frequency domain representation; and
determining, from each of the frequency domain representations, that an amount of high frequency features in the corresponding portion satisfies a threshold condition.

18. The system of claim 11, wherein determining that each of the first portion and the second portion includes features representative of vasculature in the sclera region comprises:
performing, on each of the first and second portions, an edge detection process; and
determining, based on outputs generated by the edge detection process, that each of the first and second portions includes a plurality of edges representative of the vasculature.

19. The system of claim 11, wherein the image analysis engine is configured to:
determine that a third portion of a third image of a second subject includes features representative of vasculature in a sclera region of the second subject, and that a fourth portion of a fourth image of the second subject does not include features representative of vasculature in the sclera region of the second subject;
responsive to determining that the third portion includes features representative of vasculature in the sclera region of the second subject, and that the fourth portion does not include features representative of vasculature in the sclera region, identify the second subject in the third and fourth images to be a live person; and
responsive to identifying the second subject in the third and fourth images to be a live person, initiate an authentication process for determining if the live person is authorized to access the secure system.

20. One or more non-transitory, machine-readable storage media storing machine-readable instructions that, when executed by one or more processing devices, cause the one or more processing devices to execute operations comprising:
capturing a first image of a subject illuminated by electromagnetic radiation in a first wavelength range;
capturing a second image of the subject illuminated by electromagnetic radiation in a second wavelength range different from the first wavelength range;
extracting, from the first image, a first portion representative of a sclera region of the subject;
extracting from the second image, a second portion representative of the sclera region of the subject;
determining that each of the first portion of the first image and the second portion of the second image includes features representative of vasculature in the sclera region;
responsive to determining that each of the first portion of the first image and the second portion of the second image includes features representative of vasculature in the sclera region, identifying the subject in the first image to be an alternative representation of a live person; and
responsive to identifying the subject in the first image to be an alternative representation of a live person, preventing access to a secure system.

* * * * *